United States Patent [19]

Gross et al.

[11] 4,211,637
[45] Jul. 8, 1980

[54] FCC CATALYST SECTION CONTROL

[75] Inventors: Benjamin Gross; Wooyoung Lee, both of Cherry Hill, N.J.

[73] Assignee: Mobil Oil Corporation, New York, N.Y.

[21] Appl. No.: 931,600

[22] Filed: Aug. 7, 1978

Related U.S. Application Data

[63] Continuation-in-part of Ser. No. 769,485, Feb. 17, 1977, abandoned, which is a continuation-in-part of Ser. No. 608,352, Aug. 27, 1975, abandoned.

[51] Int. Cl.² .............................................. C10G 11/18
[52] U.S. Cl. ............................ 208/164; 208/DIG. 1; 252/417
[58] Field of Search ................ 208/113, 164, DIG. 1; 252/417

[56] References Cited
U.S. PATENT DOCUMENTS

| | | | |
|---|---|---|---|
| 3,316,170 | 4/1967 | Stewart et al. | 208/164 |
| 3,886,060 | 5/1975 | Owen | 208/120 |
| 3,893,812 | 7/1975 | Conner et al. | 208/164 |

*Primary Examiner*—Herbert Levine
*Attorney, Agent, or Firm*—Charles A. Huggett; Vincent J. Frilette

[57] ABSTRACT

In the fluid catalytic cracking process, improved adaptive behavior of the catalyst section with the regenerator operating in the complete CO-burning mode is achieved by including within the regenerator, as an element of control, variable recycle of regenerated to spent catalyst. In response to excursions of the regenerated catalyst temperature, such as would be caused by change of feedstock, the recycle ratio is altered in a direction to restore the temperature to a predetermined value. The improved control system extends the useful control range, and it also diminishes counterproductive changes in severity induced by disturbances such as change of feedstock quality.

8 Claims, 3 Drawing Figures

FCC CATALYST SECTION CONTROL

CROSS REFERENCE TO RELATED APPLICATIONS

This application is a continuation-in-part of copending U.S. patent application Ser. No. 769,485 filed Feb. 17, 1977, which in turn is a continuation-in-part of copending U.S. patent application Ser. No. 608,352, filed Aug. 27, 1975, both now abandoned.

BACKGROUND OF THE INVENTION

1. Field of the Invention

This invention relates to an improved method and apparatus for controlling a fluid catalytic cracking system. More specifically, the present invention includes, as an element for control of the catalyst section, variable recycle of regenerated to spent catalyst in the regenerator.

2. Description of the Prior Art

Fluid catalytic cracking of petroleum fractions is a well-established refinery operation. The catalytic cracking apparatus per se comprises a catalyst section which is subdivided into a reactor section where catalytic cracking occurs, coupled with a regenerator section where coke deposited on spent catalyst is burned. The process operates essentially as follows. Fresh feed, usually preheated, mixed with catalyst, undergoes cracking within the reactor section. Products are removed from the reactor in the vapor phase and passed to a products recovery section comprising at least one main fractionator or distillation column for separation of the products into desired fractions. Spent catalyst, which has been coked by the cracking reaction, is continuously passed from the reactor to the regenerator by a spent catalyst transfer line. In the regenerator, the coke is burned by contact with an oxygen containing gas. Flue gas is passed from the regenerator, and regenerated catalyst is recirculated to the reactor via a standpipe where it is picked by the fresh feed hydrocarbon charge stream. The catalyst itself is finely divided and simulates a fluid in various portions of the catalyst section, whence the name of the process. In a typical operation, heat generated in the regenerator is carried by the hot regenerated catalyst to the reactor to supply heat for the cracking reactions. Typical fluid catalyst cracking systems are disclosed in U.S. Pat. Nos. 3,206,393 and 3,261,777.

The fluid catalytic cracking process has been improved in efficiency over the years. In particular, the discovery of zeolite catalysts with their greater activity and reduced coke make, and improvements in design of the reactor section to emphasize riser-cracking, are cases in point.

A recent innovation in regenerator section technology promises simultaneously to simplify the apparatus, more effectively utilize the heat evolved in regeneration, contribute better product quality, and reduce the inventory of catalyst. Whereas the conventional regenerator technology produces regenerated catalyst with about 0.3 wt.% residual coke, and a flue gas rich in carbon monoxide, the innovative technology produces regenerated catalyst substantially free of coke, i.e. less than about 0.08 wt.% and a flue gas in which the CO (carbon monoxide) has been substantially all burned to $CO_2$ (carbon dioxide), i.e. the flue gas has a CO content less than about 4000 ppm and preferably less than about 2000 ppm (As used herein, ppm refers to parts per million parts by volume.) With the innovative technology, the need disappears for the CO-boiler plant conventionally used to complete the CO burning and recover sensible heat, because complete CO-burning takes place in the regenerator itself. Aside from simplified apparatus, other advantages accrue from the innovation which include: more active regenerated catalyst; better gasoline quality; more efficient transfer to the reactor section of the heat generated in coke burnoff; and a flue gas composition ecologically suitable for direct discharge to the atmosphere. For convenience, the conventional fluid catalytic cracking technology, in which the flue gas from the regenerator section contains substantially more than about 4000 p.p.m. of CO, will be characterized herein as operating in the "partial CO-burning mode." The process operating according to the innovative technology, in which the CO content of the flue gas is about 4000 p.p.m. or less, will be referred to herein as operating in the "complete CO-burning mode."

In spite of the significant advantages of the innovative technology, its widespread acceptance by the petroleum industry is questionable. For example, relatively small disturbances in the feedstock could cause premature failure of the cyclones used in the regenerator to disengage regenerated catalyst from flue gas. Also, there is very serious question that available control systems can make the catalytic cracking apparatus sufficiently adaptive to accept changes of feedstock quality without major or catastrophic upsets such as would lead to shutdown of the plant.

The problems that are encountered with control of fluid catalytic systems operating in the complete CO-burning mode may, at first glance, appear to be related to the unusually high temperatures that presently obtain in the regenerator. However, it will be shown that a serious, more subtle constraint is present.

SUMMARY OF THE INVENTION

This invention provides an improved method for controlling the operation of a fluid catalytic cracking system comprising a reactor section and a regenerator section that operates in the complete CO-burning mode. In particular, a measured regenerator temperature is compared with a predetermined regenerator temperature, or with a measured temperature difference within the regenerator, as will be more fully explained hereinafter, and the recycle ratio of regenerated to coked catalyst within the regenerator section is adjusted in response to a function of this comparison in a direction to restore the measured temperature to the predetermined temperature. In one embodiment of this invention, the method further provides for comparing the carbon monoxide content of the flue gas discharged from the regenerator section with a predetermined carbon monoxide content, and adjusting the air flow rate to the regenerator in response to a function of this comparison in a direction to restore the carbon monoxide content to the predetermined carbon monoxide content.

In another aspect, this invention provides a control system for a fluid catalytic cracking apparatus, comprising means for adjustably recycling a fraction of hot regenerated catalyst to coked catalyst, means for measuring the deviation of the temperature of the hot regenerated catalyst from a predetermined temperature, and means responsive to said deviation for adjusting said recycle in a direction to reduce said deviation.

DETAILED DESCRIPTION OF THE INVENTION

Figure 1:
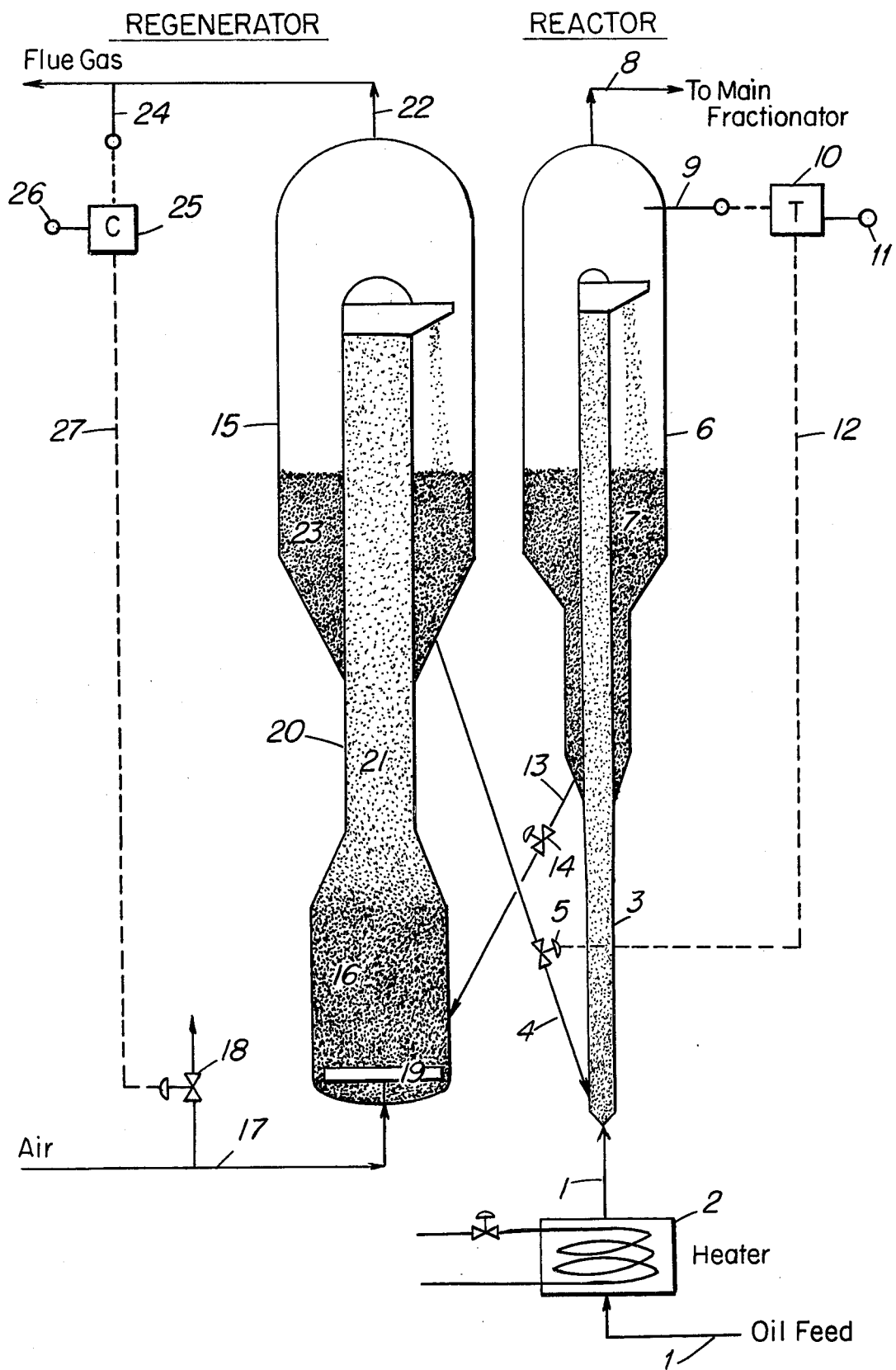
FIG. 1 is a schematic representation of a prior art catalyst section control system operating in the complete CO-burning mode.

A conventional control scheme for a catalyst section with the regenerator section operating in the complete CO-burning mode is illustrated in FIG. 1 (prior art). In FIG. 1 the oil feed, which may be preheated by the heater (2) is passed via line (1) to the lower end of riser pipe (3). Heated catalyst from a standpipe (4) having a control valve (5) is combined with the heated oil in the riser line (3) such that an oil-catalyst mixture rises in an ascending dispersed stream until it is discharged into reactor (6) and settles as a dense bed (7). In the reactor (6), there may be other fluidized contacting between oil and the catalyst particles within the relatively dense fluidized bed (7). Generally, a major portion of the necessary cracking and contact of the oil with the catalyst takes place in riser line (3). Any catalyst particles remaining suspended in the vaporous cracked reaction products are separated at the upper end of reactor (6) by centrifugal or settler type means (not shown). Products are then transferred overhead via line (8) to a products recovery section (not shown) which includes at least one fractionator. A temperature sensing means (9), such as a thermocouple, is provided to sense the temperature within reactor (6) and to provide a signal to the temperature controller (10) indicative of the temperature in the reactor (6). When the temperature of the reactor deviates from the predetermined temperature defined by the set point (11) of the temperature controller (10), the temperature controller places a signal on a line (12) to adjust the valve (5) and thus adjust the temperature of the catalyst oil mixture in riser (3) in a direction to reduce the deviation of the measured temperature from the predetermined temperature as defined by the set point (11) of the controller (10). Generally, it is highly desirable to minimize fluctuations of the temperature within reactor (6) and of the products issuing from line (8) so as to minimize disturbances in the main fractionator column. Spent catalyst from the bed (7) is continuously passed from reactor (6) by spent catalyst transfer line (13) equipped with a valve (14), and is passed to the lower portion of the regenerator (15) to form a relatively dense bed (16). Air is passed via air transfer line (17) equipped with a control valve (18) to the regenerator (15), where it passes through disperser (19) and serves to maintain bed (16) in a fluidized state and to pass catalysts continuously through the riser (20) as a dilute phase (21). In the upper portion of the regenerator (15) flue gas at substantially the same temperature as the hot regenerated catalyst, is separated from regenerated catalyst, and exits via line (22). Regenerated catalyst settles to form a relatively dense bed (23). The regenerated catalyst bed (23) is at a substantially higher temperature than the spent catalyst from bed (7) by virtue of the coke burning which occurs in the regenerator (15). Typically, this difference may be about 375° F. Within the regenerator itself, bed (23) and the flue gas in the chamber are substantially hotter than the spent but partially regenerated catalyst of bed (16), differences of about 100° F. being not uncommon. A composition sensor (24), which indicates the carbon monoxide and oxygen content of the flue gas, generates a signal indicative of that composition. Valve (18) is commonly controlled by operator intervention to control the flow of air and thus the CO and oxygen content of the flue gas. Alternatively, the signal generated by composition sensor (24) is transmitted to the composition controller (25). Controller (25), equipped with set points (26), places a signal on line (27), which signal is indicative of the deviation of the carbon monoxide composition of the flue gas from the set point (26), to adjust the control valve (18) in a direction to reduce the deviation of the measured composition from the predetermined composition as defined by the set point (26). In general, the set point is adjusted to a CO content less than 2000 ppm and the flue gas, in general, will contain about 2% excess oxygen gas. Although not explicitly shown, valve (14) is usually coupled with valve (5) in such a manner as to maintain a fixed ratio of amount of catalyst in the regenerator (15) to amount of catalyst in the reactor (6).

Figure 2:
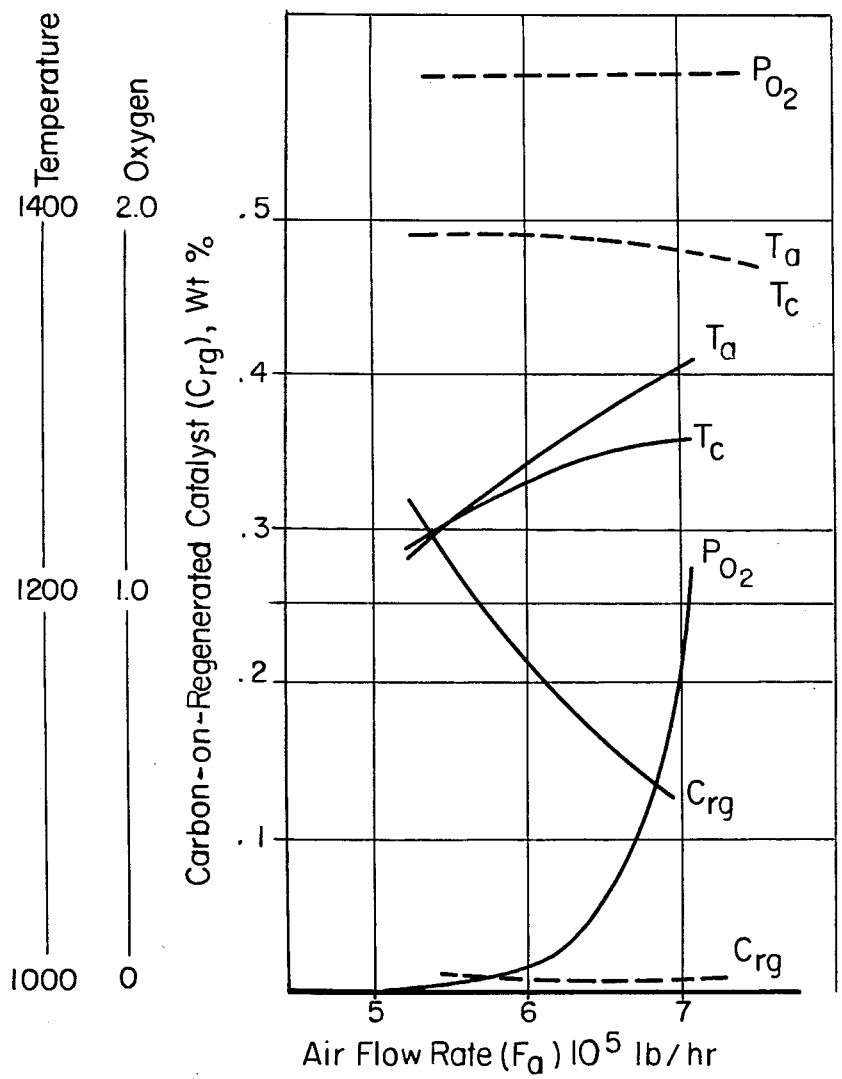
FIG. 2. are graphs of data generated by manipulation of a mathematical model.

With the control system described above for operation in the complete CO burning mode, the operation in general is conducted in a manner to insure that substantially all of the coke deposited on the catalyst in the reactor section is burned in the regenerator, that is, the residual carbon on regenerated catalyst is generally below about 0.05 wt.%. High temperatures obtain in the regenerator and the regenerated catalyst in bed (23) is generally at a temperature of at least about 1350° F. In the absence of fluctuations in the amount of coke deposited by the feed during cracking, or of fluctuations in feed temperature, or of other disturbances, the described control system will give smooth operation of the catalyst section. However, a study of the control system reveals that its adaptive behavior to sudden changes in the amount of coke formed, and thus to variations in feedstock quality, is considerably poorer than when operating in the partial CO-burning mode. Furthermore, the changes that do occur are counter-productive with regard to product composition. The reasons for this poor adaptive response will be examined in some detail. In the complete CO-burning mode, because all of the coke is substantially completely burned to $CO_2$ in the regenerator, a change in the rate of coke formation induces temperature excursions in the regenerator which are greater than in the partial CO-burning mode. Furthermore, whereas some measure of control is achievable in the partial CO-burning mode by changing the air flow rate to the regenerator, this option is relatively ineffective in the complete CO-burning mode. Computer simulations of the effect of changes in air flow rate for the two modes of operation are shown in FIG. 2. As shown, reducing the air flow rate in the conventional mode, from about 1% excess oxygen to about 0.25%, causes a substantial decrease in both the catalyst and flue gas outlet temperatures indicated as Tc and Ta, respectively. In contrast, a reduction in flow rate in the complete CO-burning mode causes relatively little change in these parameters. Also, the change is in the opposite direction; that is, an increase occurs in Tc and Ta. The explanation, in part, for the relative insensitivity of regenerator temperature to air flow rate in the complete CO-burning mode, is that the carbon on regenerated catalyst is essentially unaffected by change in the air flow rate, whereas it is strongly affected in the more conventional operation. Thus, a change, in the quality of the feedstock, which results in either a decrease or an increase in the rate of coke formation, produces an inordinate disturbance in the regenerator operating in the complete CO-burning mode, because of the *greater* temperature excursions and *lesser* response to air flow rate inherent in such mode.

Note that in the foregoing analysis no mention has been made of temperature constraints per se. Referring to FIG. 1, typical temperatures are about 1250° F. for dense bed (16), about 1300° F. midway in dilute bed (21), and about 1350° F. for dense bed (23) and the flue gas exiting via line (22). These temperatures, particularly in beds (21) and (23) are significantly higher than those conventionally employed in the partial CO-burning mode, and appear to be necessary to induce the burning of CO to $CO_2$. These temperatures cannot at present be reduced significantly without overriding the control limits of controller (25), nor can they be increased significantly without exceeding the ordinary design limits of the equipment and risk of catalyst damage. Thus, the high regenerator temperatures that currently obtain in the complete CO-burning mode constitute a third factor, in addition to greater temperature excursions and lesser response to air flow rate, which render present control systems poorly adaptive to changes in feedstock quality. However, significant advantages would still accrue from the present invention even if it were possible to operate the regenerator in the complete CO-burning mode at lower temperature.

The poor adaptive behavior of present control systems for operation in the complete CO-burning mode results in large changes in catalyst circulation rate. For example, change in feedstock to one depositing larger amounts of coke, i.e. to one of poorer quality, results in an increase in the temperature of dense bed (23) in FIG. 1, and an increase in the temperature sensed by thermocouple (9). This in turn induces controller (10) to act on valve (5) in the direction of lowering the cat-to-oil ratio, thus restoring regenerator and product temperatures to within prescribed limits. However, those skilled in the art recognize that a poorer quality feedstock requires a higher severity treatment to maintain optimum cracked product distribution. Therefore, the adjustment in cat-to-oil ratio induced by the control system is counterproductive, and its extent is another aspect of the poorly adaptive behavior of the prior-art control system.

Thus, the relatively deficient behavior of the conventional control scheme in the complete CO-burning mode is a serious deficiency of the system, which counteracts to some extent the very desirable advantages, described above, that may be obtained from the system.

Figure 3:
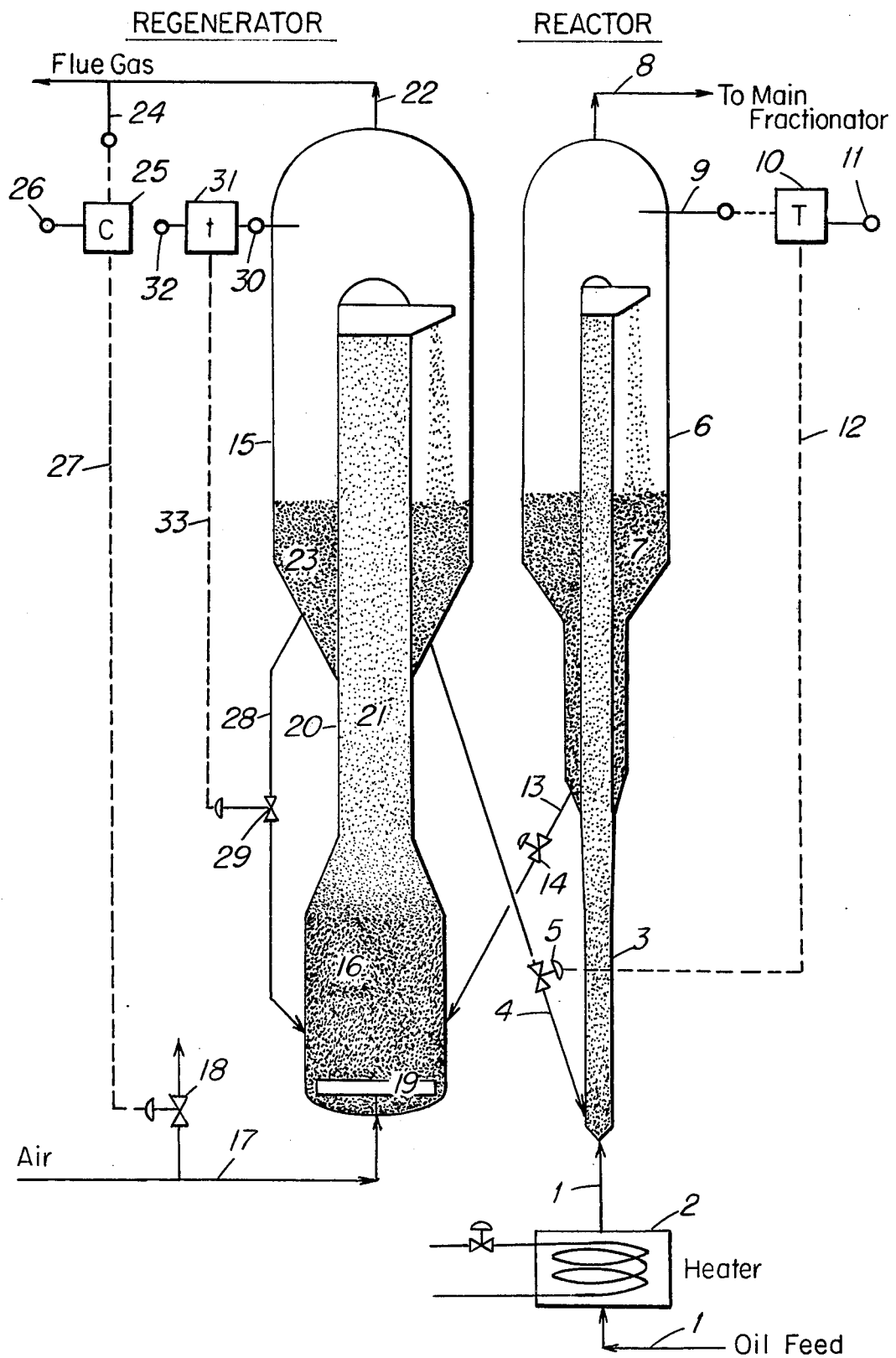
FIG. 3 is a schematic representation of a catalyst section control system according to this invention.

The present invention provides an improved control system which increases the adaptive behavior of the catalyst section of a fluid catalytic cracking unit operating in the complete CO-burning mode. Improved control is achieved by including, as a control element, the recycle of variable proportions of regenerated catalyst to spent catalyst to vary the temperature of the latter in controlled fashion. Inclusion of the controlled recycle element is illustrated in FIG. 3 of the drawing. The present invention provides not only improved adaptive behavior to disturbances such as changes in the quality of the feedstock, but additionally provides improved operation of the regenerator.

An embodiment of this invention is now described in detail by reference to FIG. 3 of the drawing. In FIG. 3, the essential elements previously identified in FIG. 1. are indexed by identical numerals. Additionally, in the present invention, one or more conduits (28) are provided for transferring regenerated catalyst (23) to partially regenerated catalyst (16). Alternatively, a conduit (28) may return regenerated catalyst directly to spent catalyst transfer line (13). In any case, the one or more conduits (28) are equipped with effective flow control means, such as valve means (29), capable of varying the recycle ratio, i.e. the ratio of the weight of regenerated catalyst transferred via conduit (28) to the weight of spent catalyst transferred via spent catalyst transfer line (13), in unit time. In essence, the function of the one or more conduits (28) is to recycle a portion of the substantially hotter regenerated catalyst (23) to the cooler catalyst (16) thereby raising the temperature of the latter. For convenience, the catalyst in bed (16) as well as that transferred from bed (7) via line (13) will be referred to as "spent" catalyst.

Additionally, there is provided a thermocouple or other temperature sensing means (30) which generates a representation of the temperature in the upper portion of regenerator (15). This representation is transmitted to the temperature controller (31) equipped with a set point (32). A deviation of the temperature measured by temperature sensing means (30) from the predetermined temperature established by the set point (32) causes the controller (31) to place a signal on line (31), which in turn causes valve means (29) to alter the recycle ratio in a direction to restore the measured temperature to the predetermined temperature. For example, if the temperature measured by (30) exceeds the predetermined temperature, valve means (29) opens to increase the recycle ratio and lower the temperature in the upper portion of regenerator (15).

Alternative locations for temperature sensing means (30) include locations in flue gas line (22) or in dense fluidized bed (23).

An optional system (not shown) for controlling the regenerator temperature is provided by two thermocouples located in beds (23) and (16), respectively. The signals provided by these are transmitted to a controller which compares the temperature difference with a predetermined temperature difference and generates a control signal which, transmitted to valve (28), changes the recycle ratio in a direction to reduce the deviation of the measured temperature difference from the predetermined value.

In another contemplated variant of the present invention, the recycle ratio may be maintained at a ratio greater than 1.5 to about 5, and preferably at a ratio greater than 1.5 to about 3, over which range the operation of the regenerator is unexpectedly stable, i.e. small changes in the quality of the feedstock or other operating parameters do not lead easily to an upset in the operation of the regenerator.

Although the illustration of this invention as shown in FIG. 3 employs automatic controllers (10), (25) and (30), it is to be understood that manual control may be substituted for one or more of these units. Automatic controllers are preferred, however, and these may be of the P-D-I (proportional-differential-integral) or less sophisticated type, depending on the requirements of the operation.

The functioning of the recycle control element to improve the adaptability of a catalyst section operating in the complete CO-burning mode is best represented by a series of calculations presented below. For purposes of illustration, the following conditions were assumed:

A fixed piece of equipment—adiabatic in operation
Dense phase volume: 5,600 cu. ft.
Dilute phase volume: 14,000 cu. ft.
Spent Catalyst
Circulation: 60 tons/minute
Carbon Content: 0.90 wt. %
Catalyst Inlet Temperature: 960° F.
Total Hold Up: 120 tons (80% in dense bed, 20% in riser)
Catalyst Residence time in the dense catalyst bed and riser: 2 minutes (with no recycle)
Regenerator Air
Low Rate: 906,000 lb/hr
High Rate: 1,120,000 lb/hr
Inlet Air Temperature: 325° F.

The calculations made assume uniform mixing of catalyst particles and a slow carbon burning rate proportional to the average concentration of carbon on the catalyst in the dense bed. The burning of CO to $CO_2$ proceeds at a slow rate in the dense fluidized bed. The rate of this reaction is much higher in the gas phase in the absence of catalyst. The calculations were made with two assumptions for the rate of CO reaction in the riser:

(1) the homogeneous gas phase rate,
(2) a rate 10% of the homogeneous gas phase rate.

For rapid, homogeneous carbon monoxide burning in the gas phase the temperature must be above 1250° F.

One series of calculations not provided herein was made with a low air rate. This was operable with undesired residual coke on regenerated catalyst and high CO in the flue gas and as soon as regenerated catalyst recycle was practiced, temperatures rose, carbon burned increased, but the CO content of the flue gas also increased beyond desired limits because of insufficient air, and also the flue gas contained zero oxygen. This type operation is considered undesirable because of the high concentration of CO in the flue gases.

A more meaningful operation supplies enough oxygen to burn the carbon to $CO_2$. Table I reports the data obtained assuming homogeneous CO burning in the riser and high air rates. However, in actual operation the rate of CO burning in the riser is depressed by the presence of catalyst solids.

TABLE I (High Air Rate - Homogeneous CO Burning In Riser)

| Recycle Ratio | Temperature, °F. | | | Carbon on Regen. Cat., wt. % | | Gas Out, mol. % | |
|---|---|---|---|---|---|---|---|
| | Cat. Mix to Regenerator | Top of Dense Bed | Top of Riser | Top Dense Bed | Top Riser | CO | $O_2$ |
| 0 | 960 | 1172 | 1404 | 0.21 | 0.011 | .004 | 2.42 |
| 1.0 | 1180 | 1291 | 1400 | 0.06 | 0.01 | 0.004 | 2.7 |
| 2.0 | 1243 | 1321 | 1393 | 0.044 | 0.016 | 0.005 | 2.4 |
| 3.0 | 1271 | 1330 | 1383 | 0.040 | 0.020 | .007 | 2.47 |

Table II is yet a further variation in which a high air was used and the CO burning rate was assumed to be only 10% of the homogeneous CO burning rate. In this series 30% of the spent catalyst entering the regenerator was directed into catalyst carried overhead from the lower dense bed and into the riser; the other 70% was directed into the lower dense bed of catalyst.

The data in Table II shows that the mol % CO in the flue gas and the wt.% carbon on regenerated catalyst are at a minimum at some value of the recycle ratio greater than 0 (zero) but less than 1. In this same range, the temperature of the hot regenerated catalyst, which is the top of riser temperature, is at a maximum. For purposes of this invention, the recycle ratio should at all times be greater than 1.5 to avoid high CO emissions and high values of carbon on regenerated catalyst.

TABLE II (High Air Rate, CO burning rate 10% of homogeneous)

| Recycle Ratio | Temperature, °F. | | | Carbon on Regen. Cat., wt. % | | Gas Out. mol. % | |
|---|---|---|---|---|---|---|---|
| | Cat. Mix to Regenerator | Top of Dense Bed | Top of Riser | Top Dense Bed | Top Riser | CO | $O_2$ |
| 0 | 960 | 1129 | 1323 | 0.221 | 0.131 | 1.81 | 5.0 |
| 1 | 1222 | 1298 | 1410 | 0.037 | 0.032 | 0.12 | 2.2 |
| 2 | 1252 | 1301 | 1360 | 0.036 | 0.04 | 0.22 | 3.1 |
| 3 | 1269 | 1305 | 1350 | .034 | 0.049 | 0.25 | 3.48 |

The above calculations illustrate the control that is achieved by varying the recycle ratio from greater than 1.5 to about 3. As a consequence of inclusion of the recycle element in the control system, variations in the quality of feedstock or other disturbances leading to temperature changes in the regenerator are moderated within the regenerator itself, thus eliminating or reducing changes of temperature of the regenerated catalyst passed to the reactor and counterproductive changes of the cat-to-oil ratio.

Whereas the illustrations encompassed by above Tables I and II illustrate operation with recycle ratios of greater than 1.5 to about 3, which represents a preferred range, recycle ratios up to about 5 may be usefully employed. The control mode is preferably set at some intermediate recycle ratio corresponding to normal performance in the absence of disturbances. Or, with a fixed recycle ratio, a most preferred setting is at a recycle ratio of about 2.

The following example is derived by mathematically simulating the behavior of a regenerator, and it is given merely to illustrate the improved adaptive behavior of this invention; it is in no way intended to limit the invention.

For purpose of illustration, assume an abrupt change in the feedstock charged to a fluid catalytic cracking apparatus according to this invention, the change being such that the carbon on spent catalyst drops from 0.70 wt.% to 0.65 wt.%, and that it is required to maintain the flue gas content of CO at a maximum level of 0.20%. This change of feedstock results in a reduction of the temperature in dense bed (16) and at top of riser (20) of FIG. 3, and excessive CO emissions, because the amount of carbon supplied to the regenerator is decreased. This is illustrated by comparison of items 3 and 8 of Table III. Without change of the recycle ratio, no adjustment of air flow rate can be made to restore CO emissions to required levels and also avoid counterproductive changes in cat-to-oil ratio (compare items 5-8 inclusive, Table III). On change of recycle ratio from 1 to 2, however, restoration of CO control is achieved along with other desirable parameters (compare items 3 and 11, Table III), obviating the necessity for any large disturbance in cat-to-oil ratio.

TABLE III

| | | REGENERATOR BEHAVIOR | | | | | |
|---|---|---|---|---|---|---|---|
| | Air Flow | Temp. °F. | | | | | |
| | lbs/lb | | Top | Flue Gas, Vol % | | | Carbon on |
| Item No. | Carbon to Regenerator | Dense Bed | of Riser | Excess $O_2$ | CO | $CO_2$ | Regenerated Catalyst, wt. % |
| (For 0.70 wt. % C on spent catalyst, recycle ratio 1.0) | | | | | | | |
| (1) | 11 | 1231 | 1275 | 0 | 2.36 | 15.1 | 0.11 |
| (2) | 12 | 1242 | 1305 | 0 | 0.32 | 16.4 | .08 |
| (3)* | 13 | 1242 | 1316 | 0.87 | 0.14 | 16.0 | .06 |
| (4) | 14 | 1231 | 1311 | 2.18 | 0.20 | 15.0 | .05 |
| (For 0.65 wt. % C on spent catalyst, recycle ratio 1.0) | | | | | | | |
| (5) | 11 | 1213 | 1259 | 0 | 1.68 | 15.4 | 0.12 |
| (6) | 12 | 1222 | 1283 | 0.22 | 0.23 | 16.3 | .09 |
| (7) | 13 | 1218 | 1287 | 1.31 | 0.25 | 15.5 | .07 |
| (8) | 14 | 1192 | 1264 | 3.06 | 0.57 | 13.9 | .08 |
| (For 0.65 wt. % C on spent catalyst, recycle ratio 2.0) | | | | | | | |
| (9) | 11 | 1231 | 1258 | 0 | 2.27 | 15.1 | 0.10 |
| (10) | 12 | 1229 | 1269 | 0.05 | 0.38 | 16.4 | 0.09 |
| (11)* | 13 | 1255 | 1299 | 0.77 | 0.14 | 16.1 | 0.06 |
| (12) | 14 | 1216 | 1264 | 2.86 | 0.45 | 14.2 | 0.07 |

*These items show optimal operation.

What is claimed is:

1. In a fluid catalytic cracking process for cracking a hydrocarbon feed stream, wherein said stream is contacted with hot regenerated catalyst in a reactor section maintained under catalytic cracking conditions to form cracked products and spent catalyst contaminated by coke; and wherein said cracked products and spent catalyst are separated in, and recovered from, said reactor section; and wherein said recovered spent catalyst is continuously circulated through a regenerator section operating in the complete CO-burning mode thereby burning said coke by contact with an oxygen containing gas and forming hot regenerated catalyst having a temperature substantially higher than said contaminated catalyst, said regenerator section being provided with adjustable means for recycling a portion of hot regenerated catalyst to said recovered spent catalyst; and wherein hot regenerated catalyst in recirculated from said regenerator section to said reactor section, the method for controlling the process, whereby improving its adaptive behavior, which comprises:

comparing the temperature of the hot regenerated catalyst with a predetermined temperature to obtain a regenerated catalyst temperature deviation; and, adjusting, within the regenerator section, the recycle of hot regenerated catalyst to spent catalyst to change the recycle ratio in a direction to reduce said temperature deviation, said recycle ratio being in the range of greater than 1.5 to about 5 before and after said change.

2. The method of claim 1 wherein said recycle ratio is adjusted within the range of greater than 1.5 to 3.

3. The method of claim 1 including the steps of comparing the carbon monoxide content of the flue gas discharged from said regenerator section with a predetermined carbon monoxide content to obtain a carbon monoxide content deviation, and adjusting the flow of oxygen-containing gas to said regenerator in a direction to reduce said carbon monoxide content deviation.

4. The method of claim 2 including the steps of comparing the carbon monoxide content of the flue gas discharged from said regenerator section with a predetermined carbon monoxide content to obtain a carbon monoxide content deviation, and adjusting the flow of oxygen-containing gas to said regenerator in a direction to reduce said carbon monoxide content deviation.

5. The method of claim 3 wherein said predetermined carbon monoxide content has a value up to about 2000 ppm.

6. The method of claim 4 wherein said predetermined carbon monoxide content has a value up to about 2000 ppm.

7. In a fluid catalytic cracking process for cracking a hydrocarbon feed stream, wherein said stream is contacted with hot regenerated catalyst in a reactor section maintained under catalytic cracking conditions to form cracked products and spent catalyst contaminated by coke; and wherein said cracked products and spent catalyst are separated in, and recovered from, said reactor section; and wherein said recovered spent catalyst is continuously circulated through a regenerator section operating in the complete CO-burning mode thereby burning said coke by contact with an oxygen containing gas and forming hot regenerated catalyst having a temperature substantially higher than said contaminated catalyst, said regenerator section being provided with adjustable means for recycling a portion of hot regenerated catalyst to said recovered spent catalyst; and wherein hot regenerated catalyst is recirculated from said regenerator section to said reactor section, the method for controlling the process, whereby improving its adaptive behavior, which comprises: maintaining the recycle of hot regenerated catalyst to spent catalyst at a recycle ratio greater than 1.5 to about 5.

8. The method of claim 7 wherein said recycle ratio is greater than 1.5 to about 3.

* * * * *